United States Patent [19]

Sasajima et al.

[11] Patent Number: 4,951,468

[45] Date of Patent: Aug. 28, 1990

[54] METHOD OF DETERMINING DUTY RATIO USED FOR OPERATIONAL CONTROL OF A SOLENOID

[75] Inventors: Koji Sasajima, Tokyo; Yoshikazu Ishikawa, Saitama, both of Japan

[73] Assignee: Honda Giken Kogyo Kabushiki Kaisha, Tokyo, Japan

[21] Appl. No.: 270,756

[22] Filed: Nov. 14, 1988

[30] Foreign Application Priority Data

Nov. 16, 1987 [JP] Japan .................... 62-288944

[51] Int. Cl.$^5$ ............................. F15B 13/044
[52] U.S. Cl. ....................... 60/487; 91/429; 91/459; 251/129.05; 361/186
[58] Field of Search ............ 361/186; 318/599; 91/361, 429, 459; 60/911, 487; 251/129.05

[56] References Cited

U.S. PATENT DOCUMENTS

| | | | |
|---|---|---|---|
| 3,768,373 | 10/1973 | Divigard | 91/417 |
| 3,874,407 | 4/1975 | Griswold | 318/599 X |
| 4,112,342 | 9/1978 | Elliott | 318/599 |
| 4,256,017 | 3/1981 | Eastman | 91/417 R |
| 4,386,553 | 6/1983 | Thoman et al. | 91/361 |
| 4,456,434 | 6/1984 | Elibiary | 137/625.69 X |
| 4,461,147 | 7/1984 | Myers | 60/389 |
| 4,744,218 | 5/1988 | Edwards et al. | 91/361 X |
| 4,766,921 | 8/1988 | Williams | 91/459 X |
| 4,811,225 | 3/1989 | Petzold et al. | 364/424.1 |
| 4,811,561 | 3/1989 | Edwards et al. | 60/420 X |

FOREIGN PATENT DOCUMENTS

| | | | |
|---|---|---|---|
| 0044202 | 1/1982 | European Pat. Off. | . |
| 55518 | 7/1982 | European Pat. Off. | 251/129.05 |
| 257820 | 3/1988 | European Pat. Off. | 318/599 |
| 58-174773 | 10/1983 | Japan | 251/129.05 |
| 59-81711 | 5/1984 | Japan | 318/599 |
| 62-4640 | 1/1987 | Japan | . |
| 62-4641 | 1/1987 | Japan | . |
| 62-216836 | 9/1987 | Japan | . |
| 64-35169 | 2/1989 | Japan | . |
| 64-78936 | 3/1989 | Japan | . |

Primary Examiner—Edward K. Look
Assistant Examiner—George Kapsalas
Attorney, Agent, or Firm—Lyon & Lyon

[57] ABSTRACT

A duty ratio for operating a solenoid is determined by calculating a duty ratio in each of basic periods and determining an operational time for which the solenoid is to be operated within each of the basic periods, based on the calculated duty ratio. When the duty ratio is reduced to the extent that the operational time is shorter than a minimum possible time of operation of the solenoid, an operational time for which the solenoid is to be operated is determined within a new period composed of a plurality of consecutive basic periods.

5 Claims, 4 Drawing Sheets

METHOD OF DETERMINING DUTY RATIO USED FOR OPERATIONAL CONTROL OF A SOLENOID

BACKGROUND OF THE INVENTION

The present invention relates to a method of determining the duty ratio for operating a solenoid for use in a duty-ratio-controlled solenoid valve.

Many various electrically controlled devices employ a solenoid for converting an electric control signal into controlled movement. More specifically, the operation of a solenoid-controlled device is controlled by selective energization and de-energization of the solenoid. More accurate control in smaller increments requires a solenoid to be energized and de-energized by controlling the duty ratio of the solenoid.

As disclosed in a Japanese Patent Application filed by applicant, for example, the operation of a servo unit for controlling the speed reduction ratio and the clutch of a hydraulic continuously variable speed transmission is controlled by a pair of duty-ratio-controlled solenoid valves. According to the disclosed control process, a time interval for which a solenoid is to be operated is detemined within a basic period (e.g., 10 milliseconds) in order to obtain a desired duty ratio in each basic period, and the solenoid is operated only for the determined time interval in each basic period.

Since a control signal applied to the solenoid of a solenoid valve is an electric signal, the time interval of operation of the solenoid can freely be set to a considerably small value. The output operation of the solenoid however, is in the form of mechanical movement, and the solenoid valve actuated by the solenoid effects mechanical movement. Therefore, there is a certain limitation on the minimum controllable time for which the solenoid valve can be operated by the solenoid, and the time interval of operation of the solenoid within the basic period cannot be reduced below that limitation, with the result that the duty ratio of operation of the solenoid cannot be set to an excessively small value. For example, if the shortest possible time period of operation of a solenoid valve is 1 millisecond within each basic period of 10 milliseconds, then the minimum duty ratio of the solenoid is 10%.

While a motor vehicle equipped with a hydraulic continuously variable speed transmission as described above is running under a normal condition, only a very small amount of working oil is supplied to and discharged from a reduction ratio controlling servo cylinder, and hence the duty ratio for controlling the operation of the solenoid valves is required to be very small. Heretofore, however, it has been difficult to attain a desirable small duty ratio for the reasons described above, and the solenoid valves could not be accurately controlled.

According to one conventional method, a smaller duty ratio can be obtained by increasing a basic period. In as much as the duty ratio is calculated per basic period, the interval in which the duty ratio is calculated is also increased, and the response of the control system to an abrupt change to be made in the duty ratio is lowered. The control system response may be prevented from being lowered by employing an interrupt process. However, the interrupt process itself requires its own control, making the overall control complex.

SUMMARY OF THE INVENTION

In view of the aforesaid shortcomings of the conventional duty ratio control processes, it is an object of the present invention to provide a method of determining a very small duty ratio for operating a solenoid without varying a basic period.

According to a method of the present invention, a time interval in which a solenoid is to be operated within a basic period is determined on the basis of a duty ratio which is calculated per basic period. If the duty ratio is reduced to the extent that the time interval of operation of the solenoid would be shorter than a minimum possible time of operation of the solenoid, then a plurality of basic periods are regarded as one period, and a time interval of operation of the solenoid is determined within that one period.

Further scope of the applicability of the present invention will become apparent from the detailed description given hereinafter. However, it should be understood that the detailed description and specific examples, while indicating a preferred embodiment of the invention, are given by way of illustration only, since various changes and modifications within the sprit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus are not limitative of the present invention and wherein.

DESCRIPTION OF THE PREFERRED EMBODIMENT

Figure 1A:
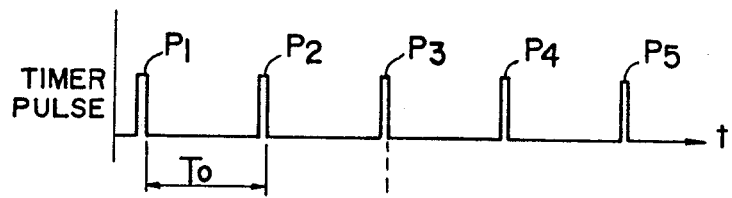
FIGS. 1A through 1C are graphs showing a timer pulse signal, a normal duty ratio signal, and a very small duty ratio signal, respectively.
Figure 1B:
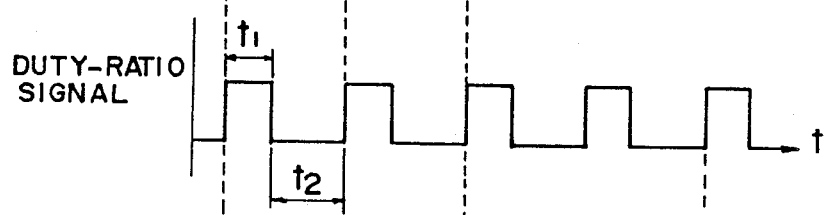

A duty ratio for operating a solenoid is determined according to a method of the present invention as follows:

Under a normal condition, as shown in FIG. 1A, a basic period $T_o$ is established according to a pulse signal containing timer pulses $P_1$, $P_2$... having a period of $T_o$ milliseconds. Then, a time interval $T_1$ in which a solenoid is to be energized and a time interval $T_2$ in which the solenoid is to be de-energized are established dependent on a duty ratio $R_D$ which has been calculated in each basic period $T_o$, as shown in FIG. 1B. The duty ratio $R_D$ at this time is $R_D = t_1/T_o$.

Figure 1C:
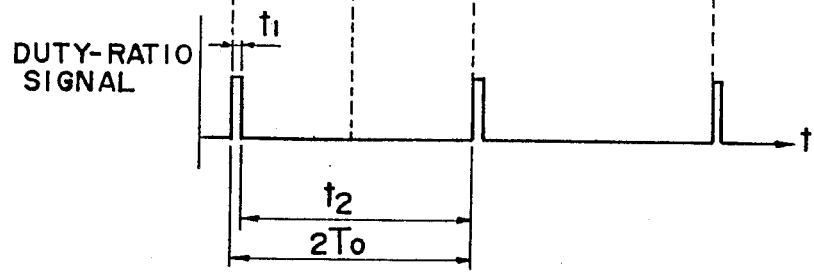

When the duty ratio $R_D$ is greatly reduced, and if the operation time interval $t_1$ has to be made shorter than a minimum possible operation time interval $t_a$ for the solenoid in order to attain the required duty ratio $R_D$ within the basic period $T_o$, the operation time interval $t_1$ is established per a plurality of consecutive basic periods $T_o$. More specifically, where the basic period $T_o$ is 10 milliseconds and the minimum operation time interval ta for the solenoid is 1 millisecond, the minimum duty ratio which can be attained in the basic period To is 10%. If a desired duty ratio is 5%, then the operation time interval $t_1$ for the solenoid is established within a period (2×To milliseconds) containing two consecutive basic periods, as illustrated in FIG. 1C. The duty ratio of 5% is attained in this case by operating the solenoid for the minimum possible operation time of 1 milliseconds within the period of 20 milliseconds which is equivalent to two consecutive basic periods of 10 milliseconds. In establishing the duty ratio within the period composed of two consecutive basic periods, a signal for operating the solenoid in the second basic period is set to zero, and the duty ratio is calculated in each basic period of To milliseconds. Therefore, detection of the duty ratio is not delayed, and the response of the control system remains unchanged.

Figure 2:
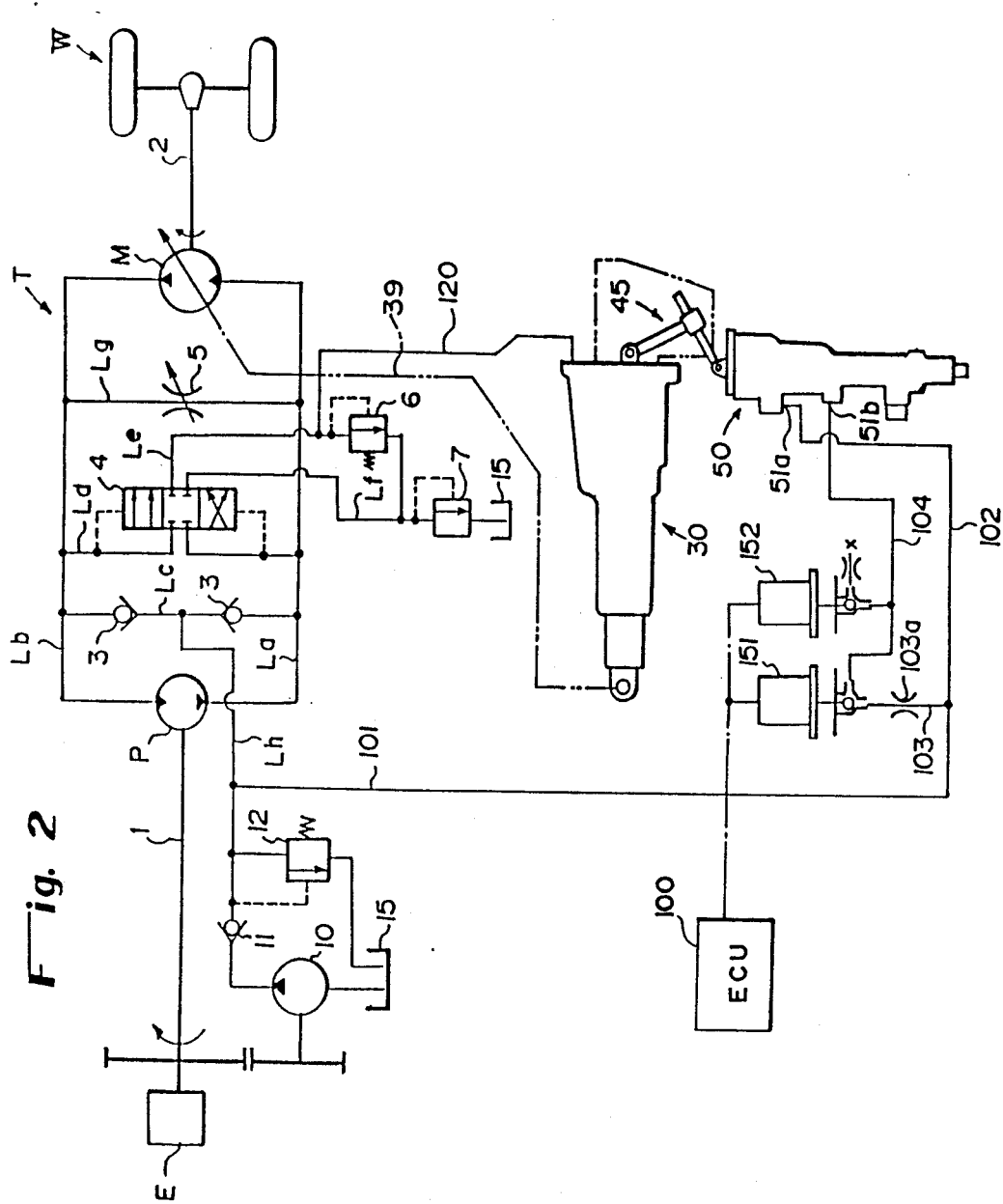
FIG. 2 is a hydraulic circuit diagram of a continuously variable speed transmission with its speed reduction ratio controlled by a duty ratio determined by a method of the present invention.

FIG. 2 shows a hydraulic continuously variable speed transmission with its speed reduction ratio controlled on the basis of the duty ratio which has been established by the method of the present invention.

The continously variable speed transmission, generally indicated by T, has a hydraulic pump P of the fixed displacement type which is drivable by an engine E through an input shaft 1, and a hydraulic motor M of the variable displacement type which has an output shaft 2 of driving road wheels W. The hydraulic pump P and the hydraulic motor M are hydraulically coupled to each other by a closed hydraulic circuit having a first hydraulic passage or line La communicating with the outlet port of the pump P and the inlet port of the motor M, and a second hydraulic line Lb communicating with the inlet port of the pump P and the outlet port of the motor M.

A charging pump 10 drivable by the engine E has an outlet port connected to the closed hydraulic circuit through a charging hydraulic line Lh having a check valve 11 and a third hydraulic line Lc having a pair of check valves 3. Working oil which is drawn from an oil sump 15 by the charging pump 10 and regulated in its pressure by a charging pressure relief valve 12 is supplied to a lower-pressure one of the hydraulic lines La, Lb through the action of the check valves 3. To the closed hydraulic circuit, there is also connected a fourth hydraulic line Ld having a shuttle valve 4 coupled to fifth and sixth hydraulic lines Le, Lf that have higher- and lower-pressure relief valves 6, 7, respectively the higher- and lower-pressure relief valves 6, 7 also being connected to the oil sump 15. The shuttle valve 4 comprises a two-port, three-position directional control valve which is operable in response to the difference between hydraulic pressures in the first and second hydraulic lines La, Lb for communicating a higher-pressure one of the first and second hydraulic lines La, Lb with the fifth hydraulic line Le and communicating the lower-pressure one of the first and second hydraulic lines La, Lb with the sixth hydraulic line Lf. The relief pressure from the higher-pressure hydraulic line is regulated by the higher-pressure relief valve 6, and the relief pressure from the lower-pressure hydraulic line is regulated by the lower-pressure relief valve 7.

Between the first and second hydraulic lines La, Lb, there is connected a seventh hydraulic line Lg providing a short circuit therebetween, the seventh hydraulic line Lg having a clutch valve 5 comprising a variable restrictor for controlling the opening of the seventh hydraulic line Lg under the control of a valve control unit (not shown). Therefore, the transmission of driving power from the hydraulic pump P to the hydraulic motor M can be controlled by controlling the restriction of the clutch valve 5.

The displacement of the hydraulic motor M is controlled to control the speed reduction ratio of the continuously variable speed transmission T by an actuator comprising firsts and second ratio control servo units 30, 50 which are operatively interconnected by a link mechanism 45. The hydraulic motor M comprises a swash-plate axial-piston motor which its displacement controllable by controlling the angle of inclination of the swash plate with the ratio control servo units 30, 50.

Operation of the ratio control servo units 30, 50 is controlled by solenoid valves 151, 152, the duty ratio of which is controlled by a signal from a controller 100. The controller 100 is supplied with signals respectively representing a vehicle speed V, an engine rotational speed Ne, a throttle valve opening $\theta$th, a swash plate angle $\theta$tr of the hydraulic motor M, and an opening or depression $\theta$acc of the accelerator pedal of the motor vehicle which is operated by the driver. Based on the supplied signals, the controller 100 produces control signals to control the solenoid valves 151, 152 for achieving a desired running mode or condition for the motor vehicle.

Figure 3:
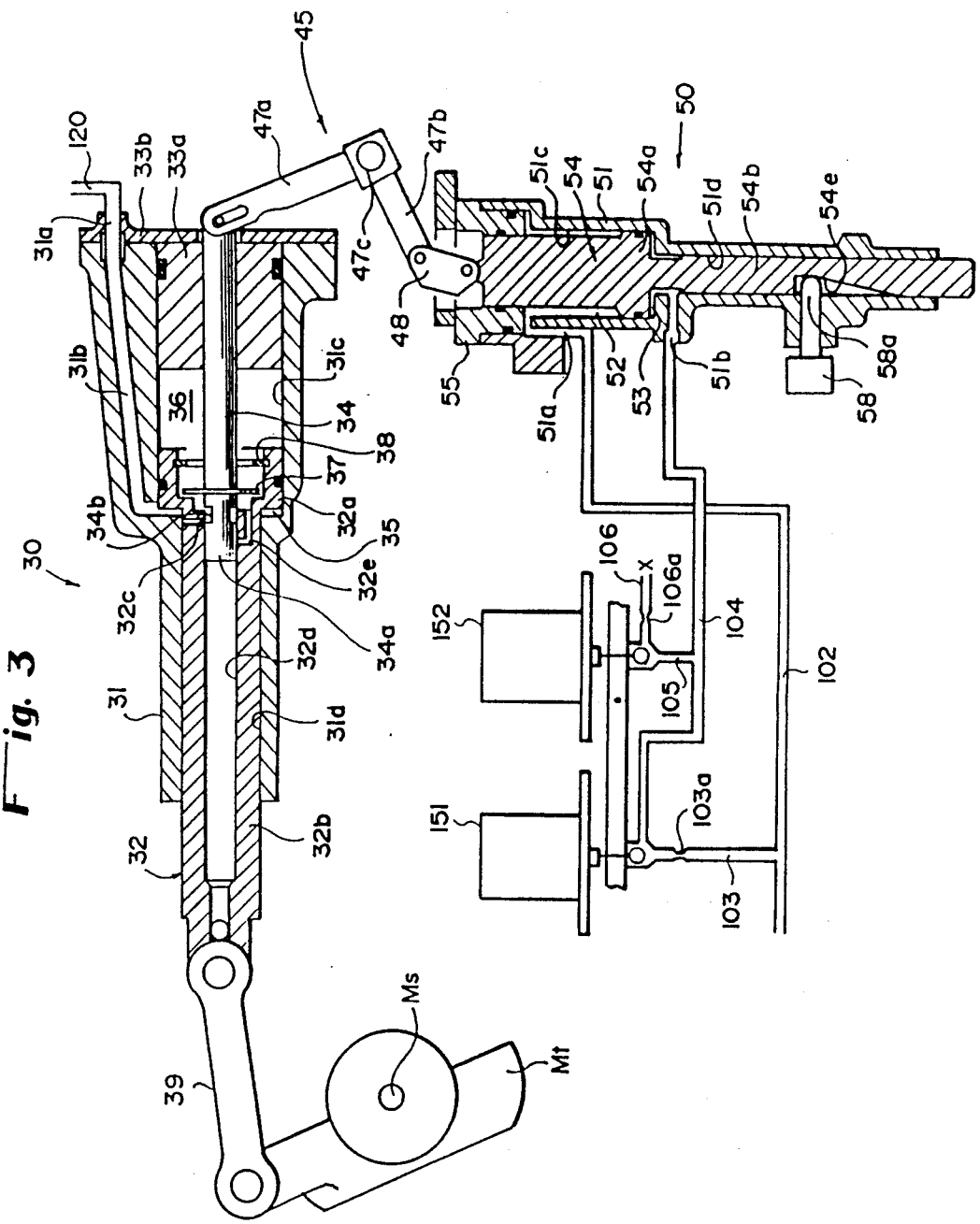
FIG. 3 is a cross-sectional view of servo units for controlling the speed reduction ratio.

The structure and operation of the servo units 30, 50 will be described below with reference to FIG. 3.

The first ratio control servo unit 30 controls the angle of the swash plate of the hydraulic motor M under a high hydraulic pressure introduced via a high-pressure line 120 branched off the fifth hydraulic line Le from the closed circuit of the continuously variable speed transmission T through the shuttle valve 4. The second ratio control servo unit 50 is operatively coupled to the first ratio control servo unit 30 through the link mechanism 45 for controlling the operation of the servo unit 30.

The first ratio control servo unit 30 has a housing 31 having a connector port 31a to which the high-pressure line 120 is connected, a piston 32 horizontally (as shown) slidably fitted in the housing 31, and a spool 34 slidably fitted coaxially in the piston 32. The piston 32 comprises a piston member 32a on its righthand end, and a cylindrical rod member 32b extending coaxially from the piston member 32a to the left (as shown in FIG. 2). The piston member 32a is fitted in a cylinder bore 31c defined in the housing 31, dividing the cylinder bore 31c into two lefthand and righthand (as shown in FIG. 2) cylinder chambers 35, 36. The rod member 32b is slidably fitted in a rod bore 31d defined coaxially with and smaller in diameter than the cylinder bore 31c. The righthand cylinder chamber 36 is closed off by a plug 33a and a cover 33b, though which the spool 34 extends.

The lefthand cylinder chamber 35 is held in communication with the high-pressure line 120 through a hydraulic passage 31b. The piston 32 is therefore pushed to the right under the hydraulic pressure introduced from the high-pressure line 120 into the lefthand cylinder chamber 35.

The spool 34 has on its inner distal end a land 34a snugly fitted in a spool bore 32d defined coaxially in the rod member 32b. The spool 34 also has a pair of diametrically opposite recesses 34b defined therein on the righthand side of the land 34a and having prescribed axial dimensions. A stop ring 37 is fixedly fitted over the spool 34 rightwardly of the recesses 34b. The land 34a is prevented from moving out of the spool bore 32d by the stop ring 37 which engages a stop ring 38 secured to the inner peripheral surface of the piston member 32a.

The piston 32 has a discharge passage 32e defined therein for venting the righthand cylinder chamber 36 through the spool bore 32d to the oil sump (not shown in FIG. 2) when the spool 34 is moved to the right, and a communication passage 32c defined therein for communicating the righthand cylinder chamber 36 with the lefthand cylinder chamber 35 through the recesses 34b upon leftward movement of the spool 34.

By moving the spool 34 to the right from the illustrated position, the land 34a closes the communication passage 32c and opens the discharge passage 32e. Therefore, oil under pressure flowing from the high-pressure line 120 via the hydraulic passage 31b acts in only the lefthand cylinder chamber 35 to move the piston 32 to the right in synchronism with the spool 34.

When the spool 34 is moved to the left, the recesses 34b bring the communication passage 32c into communication with the righthand cylinder chamber 36, and the land 34a closes the discharge passage 32e. Consequently, the high-pressure oil acts in both the lefthand and righthand cylinder chambers 35, 36. Because the piston member 32a has different pressure-bearing areas facing into the lefthand and righthand cylinder chambers 35, 36, the piston 32 is moved to the left in synchronism with the spool 34.

When the spool 32 is stopped somewhere in its stroke, the piston 32 is also stopped in a hydraulically floating condition due to the balanced pressures in the lefthand and righthand cylinder chambers 35, 36.

By moving the spool 34 to the left or the right, the piston 32 can be moved in synchronism with the spool 34 under the high hydraulic pressure introduced from the high-pressure line 120. As a consequence, the swash plate, indicated by Mt, of the hydraulic motor M which is operatively coupled to the piston 32 through a link 39 can be angularly moved about a shaft Ms to variably control the displacement of the motor M.

The spool 34 is operatively connected to the second ratio control servo unit 50 through the link mechanism 45. The link mechanism 45 comprises a first link member 42 having two arms 47a, 47b angularly movable about a shaft 47c and extending substantially perpendicularly to each other, and a second link member 48 coupled by a pin to the distal end of the arm 47b of the first link member 47b. The upper end of the arm 47a is joined by a link to the righthand end of the spool 34 of the first ratio control servo unit 30. The second link member 48 has a lower end coupled by a pin to a spool 54 of the second ratio control servo unit 50. When the spool 54 is moved vertically (FIG. 2), therefore, the spool 34 of the first ratio control servo unit 30 is moved horizontally.

The second ratio control servo unit 50 comprises a housing 51 having ports 51a, 51b to which two respective hydraulic lines 102, 104 are connected, and the spool 54 vertically slidably fitted in the housing 51. The spool 54 comprises a piston member 54a and a rod member 54b extending coaxially downwardly from the piston member 54a. The piston member 54a is fitted in a cylinder bore 51c defined vertically in the housing 51 and closed by a cover 55, dividing the cylinder bore 51c into upper and lower cylinder chambers 52, 53. The rod member 54b is slidably fitted in a rod bore 51d defined in the housing 51 and extending coaxially downwardly from the cylinder bore 51c.

The rod member 54b has a recess 54e defined in a side surface thereof and including a tapered surface. A top position detecting switch 58 mounted on the housing 51 has a spool 58a projecting into the recess 54e. Upon the upward movement of the spool 54, the spool 58a is displaced laterally to the left by the tapered surface for enabling the switch 58 to detect whether the speed reduction ratio of the hydraulic motor M is minimized or not.

The upper and lower cylinder chambers 52, 53 are held in communication with the respective hydraulic lines 102, 104 through ports 51a, 51b, respectively. The piston 54 is vertically moved under a hydraulic pressure acting on the piston member 54a which is detemined by the pressure of working oil supplied via the hydraulic lines 102, 104 into the cylinder chambers 52, 53 and the pressure-bearing areas of the piston member 54a that faces into the cylinder chamber 52, 53. The vertical movement of the spool 54 is transmitted through the link mechanism 45 to the spool 34 of the first ratio control servo unit 30 to move the spool 34 to the left or the right. Consequently, by controlling the hydraulic pressure supplied through the hydraulic lines 102, 104, the movement of the spool 34 of the first ratio control servo unit 30 can be controlled, and the piston 32 can be moved to control the angle of the swash plate Mt of the hydraulic motor M to vary the displacement of thereof for the control of the speed reduction ratio. More specifically, when the spool 54 of the second ratio control servo unit 50 is moved upwardly, the piston 52 of the first ratio control servo unit 30 is moved to the right to reduce the swash plate angle, thereby reducing the displacement of the hydraulic motor M to lower the speed reduction ratio.

The hydralic pressure in the hydraulic line 102 connected to the upper cylinder chamber 52 via the port 51a is the hydraulic pressure discharged from the charging pump 10, as regulated by the charging pressure relief valve 12, and introduced via a hydraulic line 101 connected to the hydraulic line 102. The hydraulic pressure in the hydraulic line 104 connected to the lower cylinder chamber 53 via the port 51b is the hydraulic pressure supplied from a hydraulic line 103 branched off the hydraulic line 102 and having an orifice 103a, as controlled by the two solenoid valves 151, 152 with their duty ratio being controlled by the controller 100. The solenoid valve 151 serves to control, dependent on its controlled duty ratio, the rate of flow of the working oil from the hydraulic line 103 into the hydraulic line 104. The solenoid valve 152 is disposed between a hydraulic line 105 branched off the hydraulic line 104 and a hydraulic line 106 communicating with a drain via an orifice 106a for controlling the rate of flow of the working oil from the hydraulic line 104 into the drain dependent on the controlled duty ratio of the solenoid valve 152.

Therefore, the charging pressure as regulated by the charging pressure relief valve 12 and supplied via the hydraulic line 102 acts in the upper cylinder 52. The lower cylinder 53 is supplied with a hydraulic pressure from the hydraulic line 104 which is made lower than the charging pressure by the solenoid valves 151, 152. Since the pressure-bearing area of the piston member 54a facing into the upper cylinder chamber 52 is smaller than the pressure-bearing area of the piston member 54a facing into the lower cylinder chamber 53, the forces acting on the spool 54 due to the respective hydraulic pressures in the upper and lower cylinder chamber 52, 53 are brought into equilibrium when the hydraulic pressure in the lower cylinder chamber 53 is a balancing pressure Pl lower than the hydraulic pressure Pu in the upper cylinder chamber 52 (Pu>Pl)). As a consequence, by controlling the hydraulic pressue supplied from the hydraulic line 104 into the lower cylinder chamber 53 to be higher than the balacing pressure Pl, the spool 54 can be moved upwardly to reduce the swash plate angle of the hydraulic motor M for lowering the speed reduction ratio. Conversely, by controlling the hydraulic pressure supplied into the lower cylinder chamber 53 to be lower than the balancing pressure Pl, the spool member 54 can be moved downwardly to increase the swash plate angle for increasing the speed reduction ratio.

The solenoid valves 151, 152 are controlled in operation by a signal from the controller 100. Therefore, the signal from the controller 100 is effective in controlling the operation of the first and second ratio control servo units 30, 50, controlling the displacement of the hydraulic motor M, and controlling the speed reduction ratio.

Figure 4:
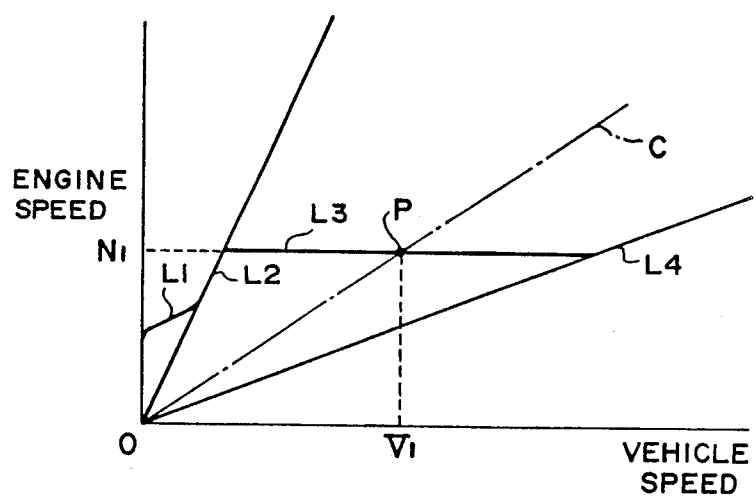
FIG. 4 is a graph showing the running characteristics of a motor vehicle which is equipped with the continuously variable speed transmission.

A motor vehicle equipped with the hydraulic continuously variable speed transmission with its speed reduction ratio controlled by the controller 100 has running characteristics as shown in FIG. 4. When the accelerator pedal of the motor vehicle is depressed to increase the rotational speed of the engine thereof while the motor vehicle is being held at rest, a main clutch is connected and thereafter the transmission is controlled to increase the speed of the motor vehicle while keeping the engine speed equal to a reference engine speed dependent on the accelerator opening. For example, the transmission is controlled to vary the motor vehicle speed from a curve $L_1$ (the main clutch is connected) to a curve $L_2$ (the vehicle speed is increased as the engine speed is increased at a maximum speed reduction ratio to a curve $L_3$ (the vehicle speed is increased by reducing the speed reduction ratio while keeping the engine speed constant) to a curve $L_4$ (after the speed reduction ratio has been minimized, the vehicle speed is increased as the engine speed is increased such as by depressing the accelerator pedal).

It is now assumed in the above transmission control process that the motor vehicle is running at a vehicle speed $V_1$ with the reference engine speed dependent on the accelerator opening being $N_1$ and with the engine output being in equilibrium with the resistance to the running of the motor vehicle at a point P (the speed reduction ratio is of a value indicated by a curve C). If no change occurs in the resistance to the running of the motor vehicle while the motor vehicle is thus running, the speed reduction ratio remains unchanged at C and it is not theoretically necessary to control the duty ratio of the solenoid valves 151, 152.

Actually, however, the engine speed is liable to deviate from the reference engine speed since the resistance to the running of the motor vehicle tends to vary slightly or fluctuate, and working oil may leak from the solenoid valves 151, 152. Such an engine speed deviation has to be corrected by operating the solenoid valves 151, 152. A duty ratio required to operate the solenoid valves 151, 152 for correcting the engine speed deviation is vary small because the speed reduction ratio is required to be modified only slightly to correct the engine speed deviation.

Usually, the required duty ratio is calculated per basic period To, and an operation time interval $T_1$ for the solenoid valves is established to attain the duty ratio within each basic period To. As described above, there is a limitation on the operation time interval $T_1$ for the solenoid which effects mechanical movement, and the operation time interval $T_1$ cannot be reduced below the minimum possible operation time interval Ta. To avoid this, as illustrated in FIG. 1C, an operation time interval $T_1$ for the solenoid valves is established using a plurality of (two in FIG. 1C) consecutive basic periods To as one period. More specifically, an operation time interval $T_1$ is established when the timer pulse $P_1$ is applied, and when the next timer pulse $P_2$ is applied (i.e., upon elapse of To milliseconds from the timer pulse $P_1$), the duty ratio is calculated but no signal is issued for operating the solenoid valves. As a result, a desired small duty ratio is attained.

By determining the duty ratio in the above manner, the solenoid valves can be operated with a very small duty ratio, and the speed reduction ratio can be varied only slightly while the motor vehicle is running under normal conditions, as described above.

In the above embodiment, the duty ratio of the solenoid valves is controlled for the control of the speed reduction ratio of the continuously variable speed transmission. However, the method of the present invention is not limited to the illustrated controlling process, but may be employed in all applications in which the duty ratio of a solenoid is controlled.

With the method of the present invention, when a duty ratio calculated per basic period is reduced to the extent that the operation time interval for a solenoid in the basic period is shorter than the minimum possible operation time interval for the solenoid, an operation time interval for the solenoid is determined within a period which comprises a plurality of consecutive basic periods. Therefore, a very small duty ratio can be established without varying the basic period. Since the basic period is not varied, the conrol system has a quick response to changes in the duty ratio by calculating the duty ratio per basic period, i.e., the response of the control system is not lowered by the method of the present invention.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A method of determining a duty ratio for operating a solenoid, comprising:
   calculating a duty ratio $R_D$ in each of basic periods $T_o$;
   determining an operational time $t_1$ for which the solenoid is to be operated within each of said basic periods $T_o$, based on said calculated duty ratio $R_D$; and
   when said duty ratio is reduced to the extent that said operational time $t_1$ is shorter than a minimum allowable time $t_a$ of operation for said solenoid, determining a new operational time for which the solenoid is to be operated within a new period, said new period being composed of a plurality of consecutive ones of said basic periods $T_o$.

2. A method according to claim 1, wherein said solenoid which is operated based on the determined duty ratio is used for controlling operation of a hydraulic on/off valve.

3. A method according to claim 2, wherein the operation of a servo unit for controlling the speed reduction ratio of a continuously variable speed transmission is controlled by said hydraulic on/off valve.

4. A method according to claim 3, wherein said continuously variable speed transmission has a hydraulic pump, a hydraulic motor, and a closed hydraulic circuit hydraulically interconnecting said hydraulic pump and said hydraulic motor, and wherein said servo unit controls the displacement of at least one of said hydraulic pump and said hydraulic motor.

5. A method of determining a duty ratio for operating a solenoid, comprising:

calculating a duty ratio ($R_D$) in each of basic periods ($T_o$);

determining an operational time ($t_1$) for which the solenoid is to be operated within each of said basic periods ($T_o$), based on said calculated duty ratio ($R_D$); and when said duty ratio is reduced to the extent that said operational time ($t_1$) is shorter than a minimum allowable time ($t_a$) of operation for said solenoid, determining a new operational time for which the solenoid is to be operated within a new period, said new period being given by integral multiples of said basic periods ($T_o$).

* * * * *